United States Patent
Kawakami et al.

(10) Patent No.: US 9,799,867 B2
(45) Date of Patent: Oct. 24, 2017

(54) LAMINATED POROUS FILM, SEPARATOR FOR NON-AQUEOUS ELECTROLYTE SECONDARY BATTERY AND NON-AQUEOUS ELECTROLYTE SECONDARY BATTERY

(71) Applicant: SUMITOMO CHEMICAL COMPANY, LIMITED, Chuo-ku, Tokyo (JP)

(72) Inventors: Takeshi Kawakami, Niihama (JP); Jian Wang, Niihama (JP); Yasutoshi Minemoto, Niihama (JP); Satoshi Yoneyama, Niihama (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 167 days.

(21) Appl. No.: 14/306,891

(22) Filed: Jun. 17, 2014

(65) Prior Publication Data

US 2014/0377630 A1   Dec. 25, 2014

(30) Foreign Application Priority Data

Jun. 21, 2013  (JP) .................................. 2013-130300

(51) Int. Cl.
   *H01M 2/16*   (2006.01)
   *H01M 10/0525*   (2010.01)
   *H01M 2/14*   (2006.01)

(52) U.S. Cl.
   CPC ......... *H01M 2/1686* (2013.01); *H01M 2/145* (2013.01); *H01M 2/166* (2013.01); *H01M 2/1653* (2013.01); *H01M 10/0525* (2013.01)

(58) Field of Classification Search
   None
   See application file for complete search history.

(56) References Cited

U.S. PATENT DOCUMENTS

| 5,683,634 A | 11/1997 | Fujii et al. |
| 6,024,773 A | 2/2000 | Inuzuka et al. |
| 2014/0057057 A1* | 2/2014 | Terai ............... H01M 2/145 427/535 |

(Continued)

FOREIGN PATENT DOCUMENTS

| JP | H10189054 A | 7/1998 |
| JP | 2004-227972 A | 8/2004 |

(Continued)

OTHER PUBLICATIONS

Notification of Reasons for Rejection dated Aug. 5, 2014 in corresponding Japanese Patent Application No. 2014-124039 with translation.

(Continued)

*Primary Examiner* — Daniel Gatewood
(74) *Attorney, Agent, or Firm* — Sughrue Mion, PLLC

(57) ABSTRACT

An object of the present invention is to provide a laminated porous film excellent in handling ability. A laminated porous film having a layer containing a polymer other than a polyolefin laminated on at least one surface of a polyolefin porous film, wherein the uplift quantity of a side perpendicular to the machine direction, when allowed to stand still for 1 hour under an environment of a temperature of 23° C. and a humidity of 50%, is 15 mm or less.

3 Claims, 1 Drawing Sheet

(56) References Cited

U.S. PATENT DOCUMENTS

2014/0147726 A1*  5/2014  Toyoda ................ C08F 220/12
                                                    429/144
2014/0220402 A1    8/2014  Ueki et al.

FOREIGN PATENT DOCUMENTS

| | | | | | |
|---|---|---|---|---|---|
| JP | 2004227972 | A | * | 8/2004 | |
| JP | 2011140633 | A | * | 7/2011 | |
| JP | 2012-009150 | A | | 1/2012 | |
| JP | 2012-094493 | A | | 5/2012 | |
| JP | 2012-221889 | A | | 11/2012 | |
| JP | WO 2013005796 | A1 | * | 1/2013 | ............ C08F 220/12 |
| JP | WO 2013080700 | A1 | * | 6/2013 | ............ H01M 2/145 |
| WO | 2013/005796 | A1 | | 1/2013 | |

OTHER PUBLICATIONS

Notice of Reasons for Rejection dated Nov. 4, 2014 in corresponding Japanese Patent Application No. 2014-124039 with translation.

\* cited by examiner

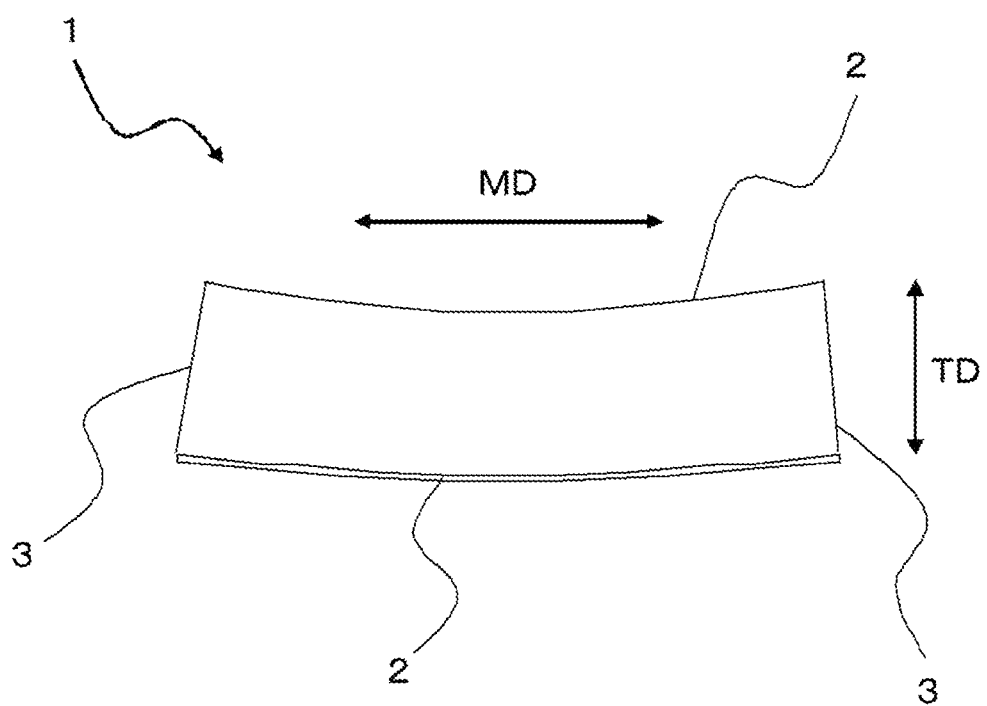

a polymer other than a polyolefin and a medium onto at least one surface of a polyolefin porous film, and drying at given drying temperature while imparting film tension with which, when imparted to the polyolefin porous film under the same temperature environment as the drying temperature, elongation rate thereof is 1% or less.

LAMINATED POROUS FILM, SEPARATOR FOR NON-AQUEOUS ELECTROLYTE SECONDARY BATTERY AND NON-AQUEOUS ELECTROLYTE SECONDARY BATTERY

TECHNICAL FIELD

The present invention relates to a laminated porous film, a separator for a non-aqueous electrolyte secondary battery and a non-aqueous electrolyte secondary battery.

BACKGROUND ART

Non-aqueous electrolyte secondary batteries such as a lithium secondary battery are widely used as a battery used for personal computers, cellular telephones, handheld information terminals and the like.

Non-aqueous electrolyte secondary batteries show abnormal heat generation in some cases due to internal short-circuit or external short-circuit. For securing safety in abnormal heat generation, a separator having a shut-down function is used. As the separator having a shut-down function, a polyolefin porous film is used.

Patent document 1 describes a laminated porous film obtained by laminating a heat-resistant layer containing cellulose ether and fine particles onto a polyolefin porous film. Patent document 2 describes a laminated porous film obtained by laminating an adhesion layer containing polyvinylidene fluoride onto a polyolefin porous film.

PRIOR TECHNOLOGICAL DOCUMENT

Patent Document (Patent document 1) JP-A No. 2004-227972
(Patent document 2) JP-A No. 10-189054

SUMMARY OF THE INVENTION

Problem to be Solved by the Invention

Conventional laminated porous films have not been sufficiently satisfactory in handling ability in laminating with an electrode for use as a separator for a non-aqueous electrolyte secondary battery.

Means for Solving the Problem

The present invention includes the following inventions.

<1> A laminated porous film having a layer containing a polymer other than a polyolefin laminated on at least one surface of a polyolefin porous film, wherein the uplift quantity of a side perpendicular to the machine direction, when allowed to standstill for 1 hour under an environment of a temperature of 23° C. and a humidity of 50%, is 15 mm or less.

<2> The laminated porous film according to <1>, wherein the laminated porous film is a laminated porous film having a layer containing a polymer other than a polyolefin laminated on one surface of a polyolefin porous film.

<3> The laminated porous film according to <1> or <2>, wherein the layer containing a polymer other than a polyolefin further contains fine particles.

<4> The laminated porous film according to <3>, wherein the fine particles are inorganic fine particles.

<5> The laminated porous film according to any one of <1> to <4>, obtained by applying a coating fluid containing a polymer other than a polyolefin and a medium onto at least one surface of a polyolefin porous film, and drying at given drying temperature while imparting film tension with which, when imparted to the polyolefin porous film under the same temperature environment as the drying temperature, elongation rate thereof is 1% or less.

<6> The laminated porous film according to <5>, wherein the drying temperature is 30 to 80° C.

<7> The laminated porous film according to <5> or <6>, wherein 80 wt % or more of the medium is composed of water.

<8> The laminated porous film according to any one of <1> to <7>, wherein the polyolefin porous film shows an elongation rate of 1% or less when a film tension of 0.05 N/mm per 1 mm of the film width is imparted along the machine direction under an environment of a temperature of 65° C.

<9> A separator for a non-aqueous electrolyte secondary battery, composed of the laminated porous film according to any one of <1> to <8>.

<10> A non-aqueous electrolyte secondary battery containing the separator for a non-aqueous electrolyte secondary battery according to <9>.

Effect of the Invention

The laminated porous film of the present invention is excellent in handling ability in laminating with an electrode for use as a separator for a non-aqueous electrolyte secondary battery.

BRIEF EXPLANATION OF DRAWINGS

FIG. 1 is a schematic explanation view showing a laminated porous film of the present invention.

MODES FOR CARRYING OUT THE INVENTION

FIG. 1 is a schematic explanation view showing a laminated porous film of the present invention (hereinafter, referred to as "laminated porous film" in some cases). The laminated porous film 1 is obtained by laminating a layer containing a polymer other than a polyolefin (hereinafter, referred to as "layer B" in some cases) (not shown) onto at least one surface of a polyolefin porous film (hereinafter, referred to as "layer A" in some cases), and contains a side along the machine direction (MD) (hereinafter, described as MD side in some cases) and a side parallel to the direction (TD) perpendicular to the machine direction (MD). Also the polyolefin porous film contains a MD side and a TD side as is the case with the laminated porous film.

The layer A contains a polyolefin as the main component, and is melted and rendered imperforate at higher temperatures. The layer A is, when the laminated porous film is used as a separator, melted and rendered imperforate in abnormal heat generation of a battery, thereby imparting a shut-down function to the laminated porous film.

The layer B is laminated onto the layer A. The layer B imparts a heated shape retaining property at temperatures not lower than the melting point of the polyolefin when the laminated porous film is used as a separator, and endows the laminated porous film with adhesiveness with an electrode, and the like.

<Layer A>

The layer A has a structure containing communicating pores in its inside, and a gas and a liquid are capable of penetrating through from one surface to another surface.

The proportion of a polyolefin contained in the layer A is usually over 50 vol %, preferably 70 vol % or more, more preferably 90 vol % or more, further preferably 95 vol % or more with respect to the solid contents.

The polyolefin contained in the layer A preferably contains a high molecular weight polyolefin having a weight-average molecular weight of $5 \times 10^5$ to $15 \times 10^6$ since the layer A and the whole laminated porous film containing the layer A get enhanced strength.

The examples of polyolefin include homopolymers or copolymers having high molecular weight obtained by polymerizing an olefin such as ethylene, propylene, 1-butene, 4-methyl-1-pentene and 1-hexene. Of them, preferable are high molecular weight polyethylenes composed mainly of ethylene and having a weight-average molecular weight of 1000000 or more.

In addition to the polyolefin, the layer A may contain other components in the range not deteriorating the function of the layer A.

The diameter of pores in the layer A is preferably 3 μm or less, further preferably 1 μm or less since when the laminated porous film is used as a separator of a battery, excellent ion permeability is attained and entering of particles into a positive electrode and a negative electrode can be prevented.

The film thickness of the layer A is preferably 4 to 40 μm, more preferably 7 to 30 μm though varying depending on the film thickness of the layer B.

The porosity of the layer A is preferably 20 to 80 vol %, more preferably 30 to 70 vol %. Within the above-described range, ion permeability is excellent, and when the laminated porous film is used as a separator for a non-aqueous electrolyte secondary battery, excellent properties are manifested.

The unit weight of the layer A is usually 4 to 15 g/m$^2$, preferably 5 to 12 g/m$^2$ since the strength, film thickness, handling ability and weight of the laminated porous film, further, the weight energy density and volume energy density of a battery when the laminated porous film is used as a separator of the battery, can be increased.

The method of producing the layer A includes, for example, a method in which a plasticizer is added to a thermoplastic resin and the resin is molded into a film, then, the plasticizer is removed with a suitable solvent (see, JP-A No. 7-29563), a method in which a film made of a thermoplastic resin produced by a known method is used, and the structurally weak amorphous portion of the film is selectively stretched to form fine pores (see, JP-A No. 7-304110) and a method in which fine particles are added to a thermoplastic resin and the resin is molded into a film, then, the fine particles are removed (see, JP-A No. 2002-69221).

The layer A shows an elongation rate of preferably 1% or less, more preferably 0.5% or less when a film tension of 0.05 N per 1 mm of the film width is imparted along the machine direction under an environment of a temperature of 65° C. Within the above-described range, uplift of the TD side of the resultant laminated porous film (hereinafter, described as MD curl in some cases) tends to be suppressed. Here, the film width is the length of the TD side. The elongation rate is an increase of the length of the MD side after imparting film tension with respect to the length before imparting film tension.

<Layer B>

By selecting the kind of the polymer other than a polyolefin contained in the layer B, the layer B functions, for example, as an adhesion layer, a heat-resistant layer or the like, and endows the laminated porous film with functions such as adhesiveness with an electrode, a heated shape retaining property at temperatures not lower than the melting point of a polyolefin, and the like. Specific examples of the layer B include an adhesion layer and a heat-resistant layer described below but it is not construed that the layer B is limited to them.

When the layer B is an adhesion layer, a separator for a non-aqueous electrolyte secondary battery composed of a laminated porous film is used and several layers of a positive electrode and a negative electrode are laminated via the separator to obtain a non-aqueous electrolyte secondary battery, and in this battery, the layer B stands between the layer A and the positive electrode and between the layer A and the negative electrode, thus, the layer A and the positive electrode and the layer A and the negative electrode are connected successfully with the layer B, respectively.

When the layer B is a heat-resistant layer, a separator for a non-aqueous electrolyte secondary battery composed of a laminated porous film is excellent in shape stability at high temperatures and excellent in a heated shape retaining property at temperatures not lower than the melting point of a polyolefin.

The polymer other than a polyolefin is not particularly restricted providing it is a polymer other than a polyolefin, and may advantageously be selected depending on the function of the layer B.

When the layer B is an adhesion layer, the polymer other than a polyolefin is preferably a polymer which manifests excellent adhesiveness both to a positive electrode and a negative electrode and to a polyolefin porous film, insoluble in an electrolyte of a battery and electrically stable in the use range of the battery, and includes, for example, polyvinylidene fluoride-type resins. The polyvinylidene fluoride-type resin includes a homopolymer of vinylidene fluoride (that is, polyvinylidene fluoride), copolymers of vinylidene fluoride with other copolymerizable monomers, and mixtures thereof and the like.

When the layer B is a heat-resistant layer, the polymer other than a polyolefin is preferably a polymer which is excellent in heat resistance, and when fine particles are contained in the layer B as described later, excellent in ability of binding fine particles mutually or binding the layer A and fine particles, insoluble in an electrolyte of a battery, and electrically stable in the use range of the battery, and examples thereof include fluorine-containing resins such as polytetrafluoroethylene; fluorine-containing rubbers such as ethylene-tetrafluoroethylene copolymer; rubbers such as styrene-butadiene copolymer and hydrides thereof, methacrylate copolymer, acrylonitrile-acrylate copolymer, styrene-acrylate copolymer, polyvinyl acetate and ethylene-vinyl acetate-vinyl versatate copolymer; resins having a melting point or a glass transition temperature of 180° C. or higher such as polyphenylene ether, polysulfone, polyether sulfone, polyphenylene sulfide, aramid, polyether imide, polyamideimide, polyether amide and polyester; binder resins such as polyvinyl alcohol, polyethylene glycol, cellulose ether, sodium alginate, polyacrylic acid, polyacrylamide and polymethacrylic acid.

Of the above-described polymers, water-insoluble polymers are preferable. Among water-insoluble polymers, at least one selected from the group consisting of aramid, polyether imide, polyamideimide, polyether amide and polyester is preferable, and aramid is particularly preferable.

Of the above-described polymers, water-soluble polymers are preferable from the standpoint of the process and environmental load. Among water-soluble polymers, at least one selected from the group consisting of cellulose ether, polyvinyl alcohol and sodium alginate is preferable, and cellulose ether is particularly preferable. Cellulose ether includes, specifically, carboxymethylcellulose (CMC), hydroxyethylcellulose (HEC), carboxyethylcellulose, methylcellulose, ethylcellulose, cyanethylcellulose, oxyethylcellulose and the like, and CMC and HEC excellent in chemical stability are preferable, and CMC is particularly preferable.

The proportion of the polymer other than a polyolefin contained in the layer B is over 50 vol %, preferably 70 vol % or more, more preferably 90 vol % or more, further preferably 95 vol % or more, with respect to 100 vol % of the sum of polymers contained in the layer B.

In addition to the polymer other than a polyolefin, the layer B may contain other components in the range not deteriorating the function of the layer B. Examples of the other components include fine particles, dispersing agents, plasticizers, pH adjusters, polymers and the like.

When the layer B is a heat-resistant layer, if the layer B further contains fine particles in addition to the polymer other than a polyolefin, then, the layer B functions as a heat-resistant layer excellent in a heated shape retaining property, and when communicating pores are formed inside of the layer B, communicatability of pores can be enhanced.

The fine particles include inorganic or organic fillers generally called a filler, and examples thereof include fillers composed of organic materials such as styrene, vinylketone, acrylonitrile, methyl methacrylate, ethyl methacrylate, glycidyl methacrylate, glycidyl acrylate and methyl acrylateand the like used singly or copolymers composed of two or more of them; fluorine-based resins such as polytetrafluoroethylene, ethylene tetrafluoride-propylene hexafluoride copolymer, ethylene tetrafluoride-ethylene copolymer and polyvinylidene fluoride; melamine resins; urea resins; polyethylene; polypropylene; polymethacrylate and the like, and fillers composed of inorganic materials such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite and glass. As the filler, inorganic fillers are preferable, inorganic oxides are more preferable, alumina is particularly preferable, from the standpoint of heat resistance and chemical stability.

The fillers can be used singly or two or more of them can be mixed.

The alumina includes α-alumina, β-alumina, γ-alumina, θ-alumina and the like, and α-alumina is preferable since thermal and chemical stability thereof is particularly high.

The fine particles include fine particles having a shape such as a spherical shape, an elliptical shape, a rectangle shape and a gourd shape, and amorphous fine particles having no specific shape, and can be appropriately selected depending on the method of producing materials of fine particles and dispersion conditions in preparing a coating fluid containing components of the layer B.

The layer B is preferably a porous layer though varying depending on its function and the degree of swelling of the polymer other than a polyolefin in an electrolyte of a non-aqueous electrolyte secondary battery, and its porosity is preferably 30 to 90 vol %, more preferably 40 to 85 vol %. Its pore diameter is preferably 3 μm or less, further preferably 1 μm or less, in terms of the diameter of a sphere when a pore is approximated as the sphere. If the average pore diameter is 3 μm or less, when a non-aqueous electrolyte secondary battery is produced, then, short-circuit does not easily occur even if a carbon powder as the main component of a positive electrode and a negative electrode and chips thereof drop.

The thickness of the layer B is usually 0.1 μm or more and 15 μm or less, preferably 1 μm or more and 10 μm or less, though varying depending on its function. If the thickness of the layer B is 10 μm or less, MD curl of the resultant laminated porous film tends to be suppressed, and when a non-aqueous electrolyte secondary battery is produced, an excellent load characteristic tends to be manifested, and if it is 0.1 μm or more, the function of the layer B is easily manifested.

When the layer B is formed on both surfaces of a layer A, the total thickness on the both surfaces is regarded as the thickness of layer B.

<Method of Laminating Layer B on at Least One Surface of Layer A>

The method of laminating the layer B on at least one surface of the layer A includes a method of separately fabricating a layer A and a layer B and bonding the layers together, and a method of preparing a coating fluid containing a component of a layer B and a medium (hereinafter, referred to as fluid B), applying the coating fluid on a layer A and removing the medium, and of them, the method of preparing a fluid B, applying it on a layer A and removing a medium is simple and preferable.

The medium is a solvent or a dispersing medium, and it may advantageously be a medium with which a component of a layer B can be dissolved or dispersed uniformly and stably. The medium include water, alcohols such as methanol, ethanol and isopropanol, acetone, toluene, xylene, hexane, N-methylpyrrolidone, N,N-dimethylacetamide, N,N-dimethylformamide and the like. The medium may be used singly or the several media may be mixed providing they are compatible.

It is preferable that 80 wt % or more of the medium is composed of water and it is more preferable that the medium is composedly only of water, from the standpoint of the process and environmental load.

The method of applying a fluid B on a layer A is not particularly restricted providing uniform wet coating is possible, and conventionally known methods can be adopted. The applying method includes, for example, a capillary coat method, a spin coat method, a slit die coat method, a spray coat method, a roll coat method, a screen printing method, a flexo printing method, a bar coater method, a gravure coater method, a die coater method and the like. The thickness of a layer B can be adjusted by controlling the application amount of a fluid B, the concentration of a polymer in a fluid B, and, when the fluid B contains fine particles, the ratio of fine particles to the polymer. Usually, application of a fluid B on a layer A and removal of a medium from the fluid B applied on the layer A are continuously conducted while conveying the layer A. By this procedure, a layer A and a layer B can be laminated continuously even if the layer A has long size. The direction of conveying a layer A is the machine direction.

The method of obtaining a fluid B is not particularly restricted providing a uniform fluid B can be obtained. When a fluid B contains, in addition to the polymer other than a polyolefin, other components, particularly, fine particles, preferable are a mechanical stirring method, an ultrasound dispersing method, a high pressure dispersing method, a media dispersing method and the like, and a high pressure dispersing method is more preferable since more uniform dispersion is easy. The mixing order in this case is not restricted, and a polymer and other components such as fine particles may be added in one step to a medium and mixed, or these may be added in any order to a medium and mixed, or these may be dissolved or dispersed separately in a medium before mixing the solutions or dispersions, providing special problems such as generation of a precipitate does not occur.

When a medium of a fluid B contains water, it is preferable to previously perform a hydrophilization treatment on a layer A, before applying a fluid B on a layer A. By the hydrophilization treatment of a layer A, applicability is improved more, and a more uniform layer B can be obtained. This hydrophilization treatment is effective particularly when the concentration of water in a medium is high.

The hydrophilization treatment of a layer A includes a treatment with a chemical such as acids and alkalis, a corona treatment, a plasma treatment and the like.

A corona treatment is preferable since a layer A can be hydrophilized in relatively short time, and additionally, modification of a polyolefin owing to corona discharge is limited only to portions near the surface of a layer A, and high applicability can be ensured without changing the nature of the inside of a layer A.

For removal of a medium from a fluid B applied on a layer A, drying is simple and preferable. The drying method includes, for example, natural drying, blast drying, heat drying, reduced-pressure drying and the like, and preferable is heat drying. Though varying depending on the medium to be used, the drying temperature is preferably 30 to 80° C., more preferably 50 to 80° C. When 30° C. or higher, sufficient drying speed is obtained, and when 80° C. or lower, a laminated porous film having excellent appearance is obtained.

It is preferable that drying is conducted at given drying temperature while imparting film tension with which, when imparted to a layer A carrying no applied fluid B under the same temperature environment as the drying temperature, the elongation rate the layer A is 1% or less, from the standpoint of suppression of MD curl of the resulting laminated porous film. This MD curl suppression effect is obtained more remarkably when a layer B is laminated on only one surface of a layer A, than in the case of lamination of a layer B on both surface of a layer A.

Film tension with which the elongation rate of a layer A carrying no applied fluid B is 1% or less under given temperature environment can be measured by a heat tensile test.

Film tension is over 0 N, preferably 0.02 N or more, more preferably 0.05 N or more per 1 mm of the film width, from the standpoint of suppression of generation of wrinkles on a layer A.

It may be permissible that film tension is applied for a certain time during drying, and it is preferable that film tension is applied constantly during drying. Initiation of application of film tension is preferably carried out after application of a fluid B and before drying, and more preferably carried out before application of a fluid B, though it may be initiated from midstream of drying. Further, it may also be permissible that application of a fluid B is conducted under the same temperature environment as the drying temperature, and drying is conducted as it is at the same temperature.

In the laminated porous film, the uplift quantity of the TD side (hereinafter, described as MD curl quantity in some cases), when allowed to stand still under an environment of a temperature of 23° C. and a humidity of 50% for 1 hour, is 15 mm or less. The MD curl quantity is preferably 10 mm or less, more preferably 5 mm or less. Since the MD curl quantity is 15 mm or less, when the laminated porous film is used as a separator for a non-aqueous electrolyte secondary battery, it is easily laminated with an electrode and handling ability thereof is excellent. Further, even if a separator is cut and work is stopped in fabricating a battery, the position of the end of the separator scarcely changes, thus, it is possible to re-start the work promptly. For obtaining a laminated porous film showing the MD curl quantity within the above-described range, there is, for example, a method of drying while applying given film tension in forming a layer B as described above, and further, it is effective that the above-prescribed films are used as the polyolefin porous film, and the thickness of a layer B is adjusted in the above-described range. When the MD curl quantity is large, the TD side is uplifted and thus the MD side is curved significantly, thus, it becomes difficult for the laminated porous film to be laminated with an electrode, leading to lowering of handling ability.

The value of the MD curl quantity is obtained as follows: that is, a laminated porous film cut into a rectangle having a MD side length of 300 mm and a TD side length of 200 mm is allowed to stand still on a flat plane under an environment of a temperature of 23° C. and a humidity of 50% for 1 hour, then, the distance from the flat plane to the TD side is measured at a position wherein uplift of the TD side from the flat plane is maximum.

The thickness of the whole laminated porous film (layer A+layer B) is usually 5 to 50 µm, preferably 8 to 40 µm, particularly preferably 9 to 30 µm. When the thickness of the whole laminated porous film is 5 µm or less, if a non-aqueous electrolyte secondary battery is produced using a laminated porous film as a separator, then, initial failure due to internal short-circuit easily occur, and when 50 µm or more, the capacity of the battery tends to be small.

The laminated porous film may have a porous film such as a heat-resistant film, an adhesive film and a protective film, other than the layer A and the layer B, in the range no t deteriorating the object of the present invention.

The laminated porous film can be suitably used as a separator for batteries, particularly, non-aqueous electrolyte secondary batteries such as a lithium secondary battery.

When a non-aqueous electrolyte secondary battery is produced using a separator for a non-aqueous electrolyte secondary battery, a high load property is obtained, the separator exerts an excellent shut-down function, and an excellent non-aqueous electrolyte secondary battery is obtained.

The present invention will illustrated further in detail by examples below, but the present invention is not limited to these examples.

EXAMPLES

In examples and comparative examples, the physical properties and the like of a layer A and a laminated porous film were measured by the following methods.
(1) Elongation Behavior of Layer A:

A tensile test was conducted at a strain rate of 250%/min at each measuring temperature using a tensile tester (manufactured by A&D Co., Ltd, tensilon universal tester RTG-1310) according to JISK7127. Based on the resultant strass-strain curve at 30° C. or 55° C., film tension with which the elongation rate of a layer A was 1% or less and the elongation rate when a tension of 0.05 N/mm was applied to a layer A at 65° C. were measured.

(2) Thickness Measurement (Unit: μm):

The thickness of a laminated porous film was measured by a high-precision digital length measuring machine manufactured by Mitutoyo Corporation.

(3) Unit Weight (Unit: g/m$^2$):

A laminated porous film was cut into a square having a side having a length of 10 cm, and its weight W (g) was measured. The unit weight was calculated according to the equation: unit weight (g/m$^2$)=W/(0.1×0.1). The unit weight of a layer B was calculated by subtracting the unit weight of a layer A from the unit weight of a laminated porous film.

(4) MD Curl Quantity (Unit: mm):

A laminated porous film was cut into a rectangle having a MD side length of 300 mm and a TD side length of 200 mm as a sample, the resultant sample was allowed to stand still on a flat plane under an environment of a temperature of 23° C. and a humidity of 50% for 1 hour, then, the distance from the flat plane to the TD side at a position wherein uplift of the TD side from the flat plane was maximum was measured using a ruler, and the measured value was adopted as the MD curl quantity. When the MD side of the sample wound in the form of roll, the MD curl quantity was unmeasurable.

<Polyolefin Porous Film A1 (Layer A)>

An ultra-high molecular weight polyethylene powder (GUR4032, manufactured by Ticona Corporation) (70 parts by weight) and a polyethylene wax having a weight-average molecular weight of 1000 (FNP-0115, manufactured by Nippon Seiro Co., Ltd.) (30 parts by weight), and, 0.4 parts by weight of an antioxidant (Irg1010, manufactured by Ciba Specialty Chemicals), 0.1 part by weight of an antioxidant (P168, manufactured by Ciba Specialty Chemicals) and 1.3 parts by weight of sodium stearate, based on 100 parts by weight of the sum of the ultra-high molecular weight polyethylene and the polyethylene wax, were added, further, calcium carbonate having an average particle size of 0.1 μm (manufactured by Maruo Calcium Co., Ltd.) was added so that its amount was 37 vol % with respect to the whole volume, and these were mixed as they were in the form of powder in a Henschel mixer, then, melt-kneaded by a twin screw kneader to give a polyolefin resin composition. The polyolefin resin composition was rolled by a pair of rolls having a surface temperature of 150° C. to fabricate a sheet. This sheet was immersed in a hydrochloric acid aqueous solution (hydrochloric acid 4 mol/L, nonionic surfactant 0.5 wt %) to remove calcium carbonate, and subsequently, stretched 6 times at 105° C., to obtain a polyolefin porous film A1.

The film tension with which the elongation rate of the resultant polyolefin porous film A1 (film thickness: 18 μm, unit weight: 7 g/m$^2$) was 1% or less was 0.17 N/mm or less at 55° C. per 1 mm of the film width. The elongation rate of the film when a tension of 0.05 N/mm was applied at 65° C. was 0.3%.

<Polyolefin Porous Film A2 (Layer A)>

A commercially available polyethylene porous film (film thickness: 12 μm, unit weight: 7.0 g/m$^2$) was used as a polyolefin porous film A2.

The film tension with which the elongation rate of the polyolefin porous film A2 was 1% or less was 0.10 N/mm or less at 30° C. and 0.07 N/mm or less at 55° C., per 1 mm of the film width. The elongation rate of the film when a tension of 0.05 N/mm was applied at 65° C. was 1.2%.

Example 1

(1) Preparation of Fluid B1

A fluid B1 was prepared by the following procedure.

To a medium composed of pure water and isopropyl alcohol at a weight ratio of 95:5 were added carboxymethylcellulose (CMC, manufactured by Daicel FineChem Ltd.: 1110) and alumina (manufactured by Sumitomo Chemical Co., Ltd.: AKP3000) at a weight ratio of 3:100 so that the solid content was 28 wt %, and these were mixed and treated three times under high pressure dispersion conditions, to prepare a fluid B1.

(2) Production of Laminated Porous Film

The fluid B1 was applied directly on one surface of the polyolefin porous film A1 using a gravure coater and dried at 55° C. while applying a film tension of 0.04 N/mm per 1 mm of the film width, to obtain a laminated porous film having a whole thickness of 22 μm. The physical properties of the resultant laminated porous film are shown in Table 1.

Example 2

A laminated porous film having a whole thickness of 15 μm was obtained in the same manner excepting that the layer A was the polyolefin porous film A2, in (2) production of laminated porous film of Example 1. The physical properties of the resultant laminated porous film are shown in Table 1.

Example 3

A laminated porous film having a whole thickness of 15 μm was obtained in the same manner excepting that the drying temperature of 30° C. in Example 2. The physical properties of the resultant laminated porous film are shown in Table 1.

Example 4

(1) Preparation of Fluid B2

A fluid B2 was prepared by the following procedure.

To a medium composed of pure water and isopropyl alcohol at a weight ratio of 90:10 were added polyvinyl alcohol (manufactured by Wako Pure Chemical Industries, Ltd: Polyvinyl alcohol 3500, partial saponification type) and alumina (manufactured by Sumitomo Chemical Co., Ltd.: AKP3000) at a weight ratio of 3:100 so that the solid content was 20 wt %, and these were mixed and treated under high pressure dispersion conditions, to prepare a fluid B2.

(2) Production of Laminated Porous Film

The fluid B2 was applied directly on one surface of the polyolefin porous film A2 using a gravure coater and dried at 60° C. while applying a film tension of 0.07 N/mm per 1 mm of the film width, to obtain a laminated porous film having a whole thickness of 16 μm. The physical properties of the resultant laminated porous film are shown in Table 1.

Example 5

(1) Preparation of Fluid B3

A fluid B3 is prepared by the following procedure.

To a medium composed of N-methylpyrrolidone are added an aramid resin, alumina 1 (manufactured by Evonik Industries AG: Alumina C) and alumina 2 (manufactured by Sumitomo Chemical Co., Ltd.: AA03) at a weight ratio of 1:1:1 so that the solid content is 4.4 wt %, and these are mixed and treated under high pressure dispersion conditions, to prepare a fluid B3.

(2) Production of Laminated Porous Film

A laminated porous film is obtained in the same manner as Example 1. The MD curl quantity of the resultant laminated porous film is 15 mm or less.

Example 6

(1) Preparation of Fluid B4

A fluid B4 is prepared by the following procedure.

To a medium composed of pure water and isopropyl alcohol at a weight ratio of 95:5 are added a styrene-butadiene rubber, carboxymethylcellulose (manufactured by Daicel FineChem Ltd.: 1110) and alumina (manufactured by Sumitomo Chemical Co., Ltd.: AKP3000) at a weight ratio of 3:1:100 so that the solid content is 28 wt %, and these are mixed and treated under high pressure dispersion conditions, to prepare a fluid B4.

(2) Production of Laminated Porous Film

A laminated porous film is obtained in the same manner as Example 1. The MD curl quantity of the resultant laminated porous film is 15 mm or less.

Example 7

(1) Preparation of Fluid B5

A fluid B5 is prepared by the following procedure.

To a medium composed of pure water and isopropyl alcohol at a weight ratio of 95:5 are added an ethylene-vinyl acetate-vinyl versatate copolymer (manufactured by Sumika Chemtex Co., Ltd.: Sumikaflex® 950HQ), carboxymethylcellulose (manufactured by Daicel FineChem Ltd.: 1110) and alumina (manufactured by Sumitomo Chemical Co., Ltd.: AKP3000) at a weight ratio of 3:1:100 so that the solid content is 28 wt %, and these are mixed and treated under high pressure dispersion conditions, to prepare a fluid B5.

(2) Production of Laminated Porous Film

A laminated porous film is obtained in the same manner as Example 1. The MD curl quantity of the resultant laminated porous film is 15 mm or less.

Example 8

(1) Preparation of Fluid B6

A fluid B6 is prepared by the following procedure.

To a medium composed of pure water and isopropyl alcohol at a weight ratio of 95:5 are added a styrene-acrylic copolymer (manufactured by Showa Denko K.K.: Polysol® AP-1900), carboxymethylcellulose (manufactured by Daicel FineChem Ltd.: 1110) and alumina (manufactured by Sumitomo Chemical Co., Ltd.: AKP3000) at a weight ratio of 5:2:100 so that the solid content is 28 wt %, and these are mixed and treated under high pressure dispersion conditions, to prepare a fluid B6.

(2) Production of Laminated Porous Film

A laminated porous film is obtained in the same manner as Example 1. The MD curl quantity of the resultant laminated porous film is 15 mm or less.

Comparative Example 1

A laminated porous film having a whole thickness of 15 μm was obtained in the same manner excepting that the film tension was 0.13 N/mm per 1 mm of the film width in Example 2. The physical properties of the resultant laminated porous film are shown in Table 1. In the resultant laminated porous film, the MD side wound in the form of roll, thus, the MD curl quantity was unmeasurable.

TABLE 1

| | Drying temperature (° C.) | Film tension (N/mm) | Thickness (μm) | Unit weight (g/m$^2$) | MD curl quantity (mm) |
|---|---|---|---|---|---|
| Example 1 | 55 | 0.04 | 22 | 6.8 | 7 |
| Example 2 | 55 | 0.04 | 15 | 3.8 | 11 |
| Example 3 | 30 | 0.04 | 15 | 3.8 | 8 |
| Example 4 | 55 | 0.07 | 16 | 4.1 | 15 |
| Comparative Example 1 | 55 | 0.13 | 15 | 3.8 | unmeasurable |

Each laminated porous film obtained in Examples 1 to 4 was, when used as a separator for a non-aqueous electrolyte secondary battery, easily laminated with an electrode, and its handling ability was excellent. Each laminated porous film obtained in Examples 5 to 8 is, when used as a separator for a non-aqueous electrolyte secondary battery, easily laminated with an electrode, and its handling ability is excellent. The laminated porous film obtained in Comparative Example 1 wound in the form of roll and was, when used as a separator for a non-aqueous electrolyte secondary battery, hardly laminated with an electrode, and its handling ability was poor.

INDUSTRIAL APPLICABILITY

The laminated porous film of the present invention is excellent in handling ability in laminating with an electrode for use as a separator for a non-aqueous electrolyte secondary battery.

EXPLANATION OF REFERENCES

1 laminated porous film
2 MD side
3 TD side

The invention claimed is:

1. A laminated porous film having a layer containing a polymer other than a polyolefin laminated on at least one surface of a polyolefin porous film, wherein the uplift quantity of a side perpendicular to the machine direction, when allowed to stand still for 1 hour under an environment of a temperature of 23° C. and a humidity of 50%, is 15 mm or less, the laminated porous film being obtained by applying a coating fluid containing a polymer other than a polyolefin and a medium onto at least one surface of a polyolefin porous film, and drying the coating fluid at given drying temperature while imparting film tension of 0.05 N or more per 1 mm of the film width with which, when imparted to the polyolefin porous film under the same temperature environment as the drying temperature, elongation rate thereof is 1% or less.

2. The laminated porous film according to claim 1, wherein the drying temperature is 30 to 80° C.

3. The laminated porous film according to claim 1, wherein 80 wt % or more of the medium is composed of water.

* * * * *